United States Patent
Yoshizawa et al.

(10) Patent No.: US 7,977,585 B2
(45) Date of Patent: Jul. 12, 2011

(54) CLOSED-TYPE MOTOR

(75) Inventors: Takeshi Yoshizawa, Kitasaku-gun (JP); Katsufumi Ohkouchi, Kitasaku-gun (JP); Hidenori Mizukami, Kitasaku-gun (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 211 days.

(21) Appl. No.: 12/453,921

(22) Filed: May 27, 2009

(65) Prior Publication Data
US 2010/0000786 A1 Jan. 7, 2010

(30) Foreign Application Priority Data
Jul. 4, 2008 (JP) .................................. 2008-176249

(51) Int. Cl.
*H02G 3/18* (2006.01)
(52) U.S. Cl. .................. 174/659; 174/152 G; 174/151; 174/135; 16/2.1; 248/56
(58) Field of Classification Search .................. 174/659, 174/152 G, 153 G, 11 BH, 14 BH, 151, 135; 439/501, 453, 921; 16/2.1, 2.2; 248/56
See application file for complete search history.

(56) References Cited

U.S. PATENT DOCUMENTS

| | | | | |
|---|---|---|---|---|
| 5,060,891 A * | 10/1991 | Nagy et al. | ...................... | 248/56 |
| 5,925,851 A * | 7/1999 | Sugahara | ....................... | 174/662 |
| 6,257,923 B1 * | 7/2001 | Stone et al. | .................... | 439/502 |
| 6,364,724 B1 * | 4/2002 | Nozawa et al. | ................... | 440/77 |
| 7,291,785 B2 * | 11/2007 | Riester et al. | ................ | 174/72 A |
| 7,709,755 B2 * | 5/2010 | Pfister | ............................ | 174/668 |

FOREIGN PATENT DOCUMENTS
JP   A-2002-034199   1/2002
* cited by examiner

*Primary Examiner* — Dhiru R Patel
(74) *Attorney, Agent, or Firm* — Oliff & Berridge, PLC

(57) ABSTRACT

A closed-type motor has an elastic grommet with a through-hole into which a lead wire is inserted. The grommet covers an opening portion of a case. An elastic tube is connected to the grommet, and a cover covers the grommet. The grommet includes a pedestal portion abutted to the case; a tubular projection with the through-hole; and an annular groove surrounding a basal portion of the tubular projection. The tubular projection has an internal sectional area being equal to or larger than the one of the lead wire. The tube has an internal sectional area being equal to or larger than the one of the lead wire and has an inner diameter being equal to or less than an outer diameter of the tubular projection. The cover is provided with a central hole having a diameter being equal to or larger than an outer diameter of the tube.

9 Claims, 7 Drawing Sheets

F I G. 1
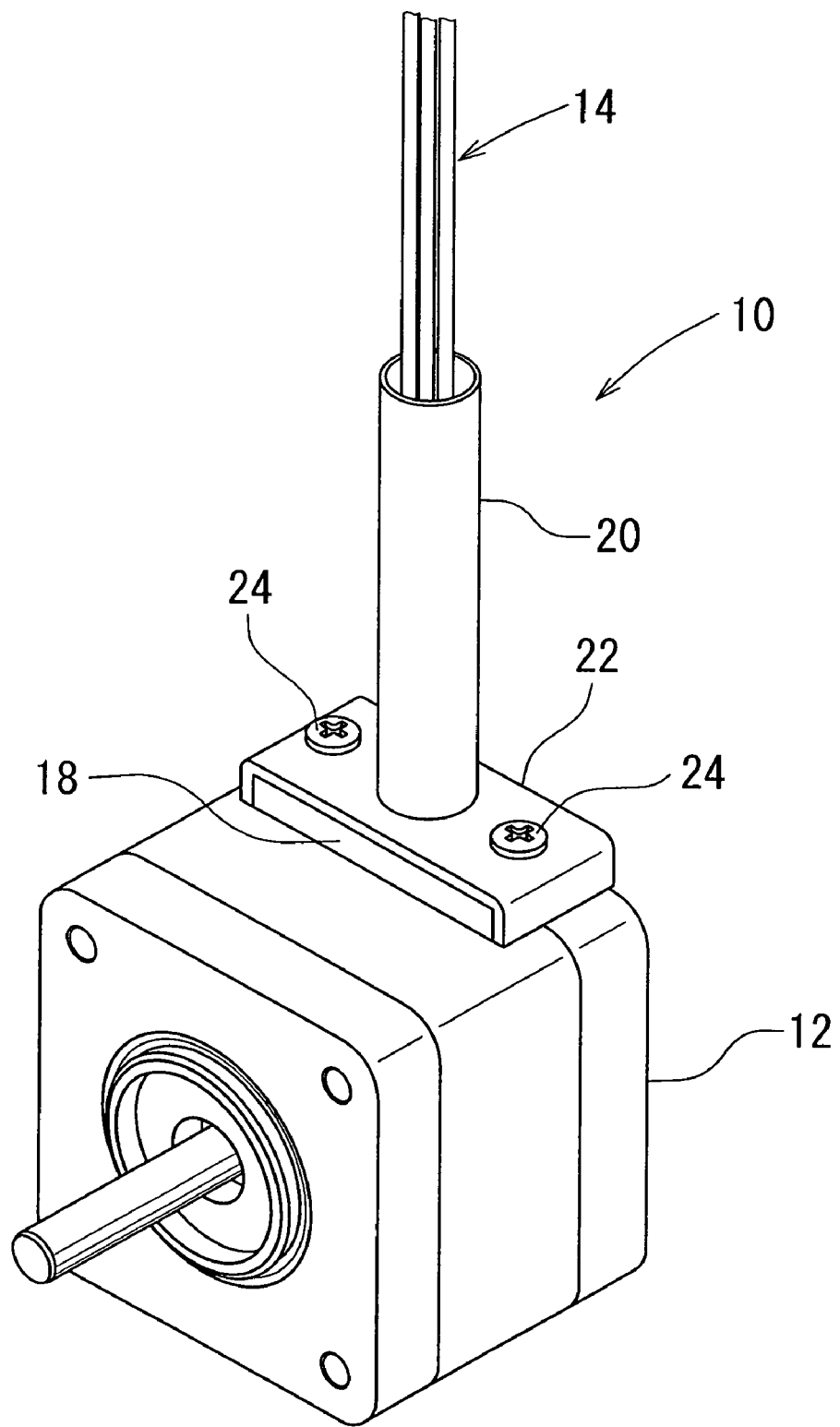

F I G. 7
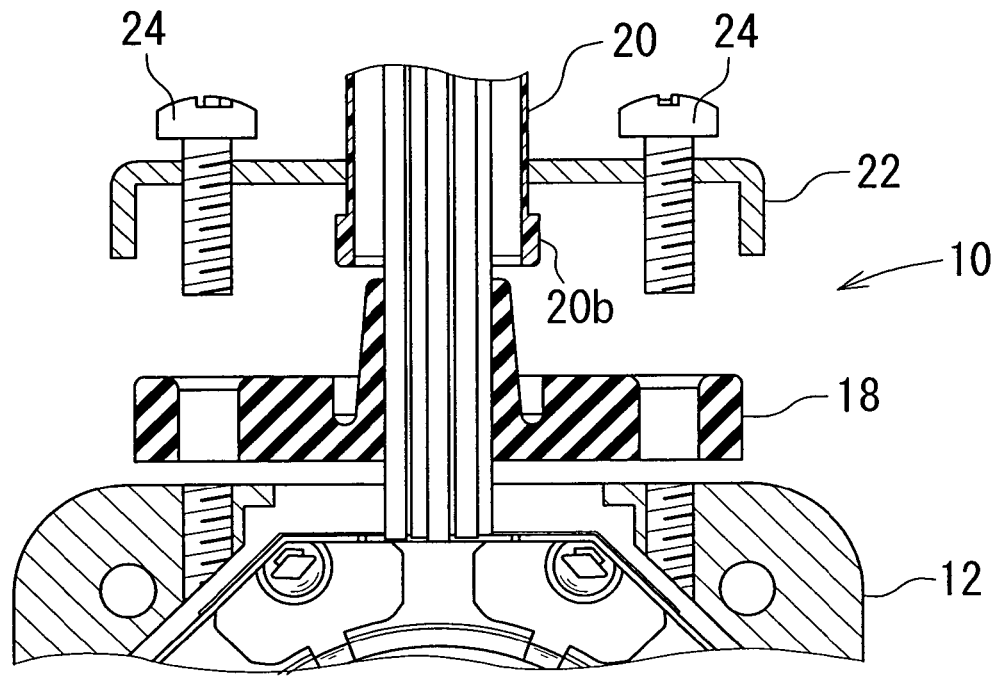
F I G. 8
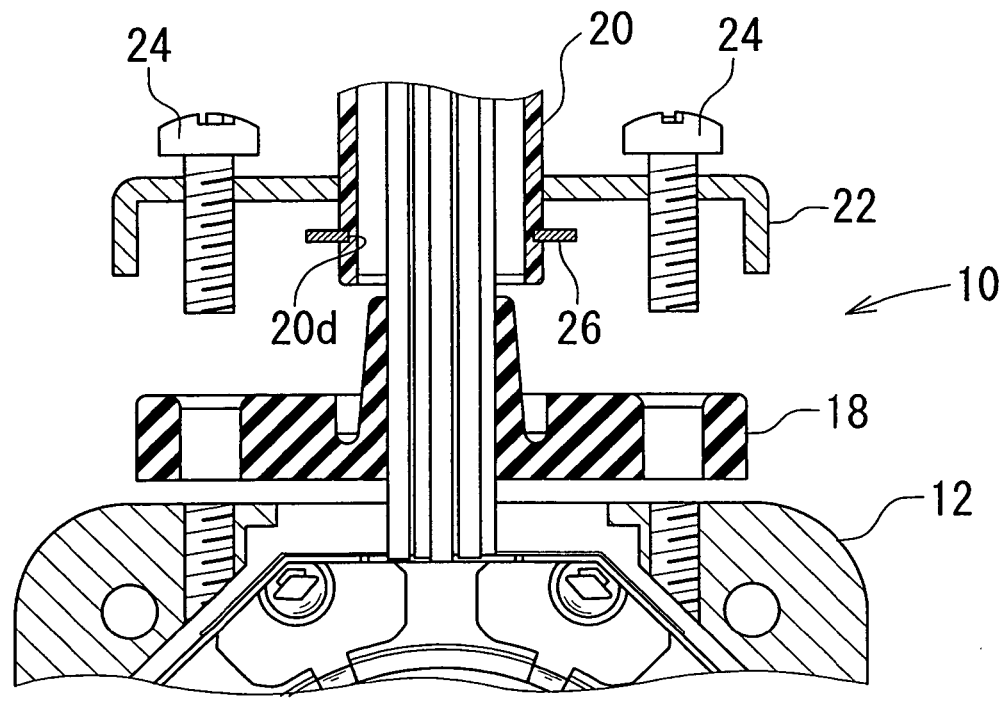

CLOSED-TYPE MOTOR

BACKGROUND OF THE INVENTION

1. Field of the Invention

The present invention relates to a closed-type motor superior in dust and water resistance.

2. Description of the Related Art

In conventional closed-type motors, there have been problems of sealing treatments applied to a wire-drawn portion of a lead wire in a motor case. In the past, as structures in which to seal a clearance between an opening portion of a case and a lead wire, the following have been, for example, introduced: 1) Flow-type silicone rubber is inpoured into the clearance so as to seal the opening portion of the case and the lead wire; and 2) A double-tube bush is fitted into the opening portion of the case, the lead wire is then inserted into an inner tube of the double-tube bush, a tip of a tube that covers the lead wire is inserted between the inner tube and an outer tube of the double-tube bush, and the outer tube and the tube are fixed with a linkage band. See, for example, Japanese Patent Application Laid-Open No. 2002-34199 (hereinafter referred to as Patent Document 1). Still further, a structure using a water-resistant connector header at the wire-drawn portion of the lead wire pulled out from the case has also been introduced. With this structure, the clearance between the opening portion of the case and the lead wire can be eliminated.

However, in the structure where the clearance between the opening portion of the case and the lead wire is sealed with the flow-type silicone rubber, especially in a case where a plurality of the lead wires are used, clearance tends to be produced between each of the lead wires whereby it may be difficult to keep sealing qualities even. On the other hand, in the structure disclosed in the Patent Document 1, it may not be easy to ensure a good sealed condition between the case and the bush, and a rigid resin-made tube with high hardness may be required in order to prevent the tube from being damaged by the binding band whereby handling of the lead wire (such as bending) may be subjected to some restrictions. Furthermore, in the structure where the water-resistant connector header is used, it may ensure a stable water-resistant quality; however, the water-resistant connector header tends to be expensive, and the case needs to be enlarged in order to house the connector head.

SUMMARY OF THE INVENTION

The present invention has been made in light of the above problems, and it is an object of the present invention to provide a closed-type motor, which prevents enlargement of a motor case and ensures sealed condition of a wire-drawn portion of a lead wire in the case.

Hereinafter, embodiments of the present invention will be illustrated and explained with specific exemplars; however, those exemplars should not be treated as limitation to the technical scope of the present invention, and variations in which parts of constituent members in the exemplars are substituted or eliminated or in which additional constituent members are provided may be included in the technical scope of the present invention.

In order to achieve the object described above, according to an aspect of the present invention, there is provided a closed-type motor comprising: an elastically-formed grommet with a through-hole into which a lead wire is inserted, the grommet being abutted on a case of a motor so as to cover an opening portion formed on the case; an elastically-formed tube connected to the grommet where the lead wire is inserted into an interior of the tube; a cover which covers the grommet and is fixed to the case, wherein the grommet comprises: a pedestal portion abutted to the case; a tubular projection provided with the through-hole into which the lead wire is inserted, the tubular projection protruding outside the case from the pedestal portion; and an annular groove surrounding a basal portion of the tubular projection, the tubular projection having a sectional area of an internal hole which is equal to or larger than a sectional area of the lead wire to be inserted into the tubular projection, the tube having a sectional area of an internal hole which is equal to or larger than the sectional area of the lead wire and has an inner diameter which is equal to or less than an outer diameter of the tubular projection of the grommet, and the cover is provided with a central hole having a diameter which is equal to or larger than an outer diameter of the tube so as to insert the tubular projection of the grommet and the tube thereinto.

With respect to the closed-type motor based on the above architecture, by making the grommet in close contact with the case by means of the cover, it is possible to ensure a superior sealed condition between the case and the grommet. Since the internal surface of elastically-formed tube adheres to the outer periphery of the tubular projection when it is fitted to the outer periphery of the tubular projection of the grommet, a superior sealed condition between the grommet and the tube is also ensured. Furthermore, by making the pedestal portion of the grommet abutted to the case, the sealed condition between the case and the grommet can be ensured. Since the inner diameter of the tube is formed to be equal to or less than the outer diameter of the tubular projection of the grommet, by fitting the tube to the tubular projection of the grommet, the tube or the tubular projection of the grommet is elastically deformed so as to adhere to each other, contributing to the superior sealed condition between the grommet and the tube. Moreover, since one end of the tube is fitted into the annular groove surrounding the basal portion of the tubular projection of the grommet, it is possible to enhance sealed condition between the grommet and the tube so as to concurrently prevent any displacement therebetween. In addition, the sectional area of the inner hole of the tubular projection is formed to be equal to or larger than the sectional area of the lead wire inserted into the tubular projection, whereby the lead wire is not compressed by the tubular projection, preventing insulating layers of the lead wire from being damaged. Also, since the sectional area of the inner hole of the tube is formed to be equal to or larger than the sectional area of the lead wire, the lead wire is not compressed by the tube thereby preventing the insulating layers of the lead wire from being damaged. Still further, in a state where the tubular projection of the grommet and the tube fitted to the tubular projection are inserted into the central hole of the cover, the cover covers the grommet and is fixed to the case. The grommet can be thus abutted to the case.

According to the first aspect of the present invention, there is provided with the closed-type motor, wherein one end portion of the tube is provided with a large diameter portion which is larger than a diameter of the central hole of the cover.

With respect to the closed-type motor based on the above architecture, in a state where the tubular projection of the grommet and the tube fitted to the tubular projection are inserted into the central hole of the cover, the cover covers the grommet and is fixed to the case. Here, the large diameter portion formed on the end portion of the tube functions as stopper to prevent the tube from being slipped off from the central hole of the cover.

According to the first aspect of the present invention, there is provided with the closed-type motor, wherein the large diameter portion of the tube is formed by turning up the end portion of the tube.

With respect to the closed-type motor based on the above architecture, the large diameter portion of the tube formed by turning up the end portion thereof functions as stopper to prevent the tube from being slipped off from the central hole of the cover.

According to the first aspect of the present invention, there is provided with the closed-type motor, wherein the large diameter portion of the tube is formed as that the turned up end portion of the tube is further extended outside in a radius direction.

With respect to the closed-type motor based on the above architecture, the large diameter portion of the tube, the end portion of which is turned up and further extended outside in a radius direction, functions as stopper to prevent the tube from being slipped off from the central hole of the cover.

According to the first aspect of the present invention, there is provided with the closed-type motor, wherein the large diameter portion of the tube is formed by making the end portion of the tube thicker in a radius direction than the rest of the portions of the tube.

With respect to the closed-type motor based on the above architecture, the large diameter portion of the tube, the end portion of which is made thicker in the radius direction than the rest of the portions of the tube, functions as stopper to prevent the tube from being slipped off from the central hole of the cover.

According to the first aspect of the present invention, there is provided with the closed-type motor, wherein the large diameter portion of the tube is formed by fixing an individual ring adjacent to the end portion of the tube.

With respect to the closed-type motor based on the above architecture, since the large diameter portion of the tube is formed by fixing the individual ring adjacent to the end portion of the tube, the tube can be prevented from being slipped off from the central hole of the cover. Here, fixation methods of the ring are not limited to any particular way, but the ring can be: fixed directly on the end portion of the tube; fixed on the end portion of the tube which has been turned up beforehand; fixed on the end portion of the tube in a state where the end portion of the tube first turned up is extended outside in a radius direction; or fixed on the end portion of the tube which is formed thicker than the rest of the portions of the tube.

According to the first aspect of the present invention, there is provided with the closed-type motor, wherein an outer peripheral wall of the tubular projection of the grommet is formed as gradually reducing its diameter from the basal portion to a tip portion of the tubular projection.

With respect to the closed-type motor based on the above architecture, since the outer peripheral wall of the tubular projection of the grommet is formed as gradually reducing its diameter from the basal portion to the tip portion, an end portion of the tube can be easily and ensurely inserted on the tubular projection.

According to the first aspect of the present invention, there is provided with the closed-type motor, wherein the cover comprises: a flat portion abutted on an upper surface of the pedestal portion of the grommet; and a leg portion bent along a lateral face of the pedestal portion of the grommet, the leg portion being shorter than thickness of the pedestal portion.

With respect to the closed-type motor based on the above architecture, in a state where the flat portion of the cover is simply attached on the upper surface of the pedestal portion of the grommet, the leg portion shorter than thickness of the pedestal portion is spaced relative to the case of the closed-type motor. However, by compressing the pedestal portion of the grommet with the cover so as to abut the leg portion against the case, the grommet is strongly pressed against the case, contributing to enhancing the sealed condition between the case and the grommet.

According to the first aspect of the present invention, there is provided with the closed-type motor, wherein the grommet and the cover are each provided with a screw-hole for a screw which is threaded into the case.

With respect to the closed-type motor based on the above architecture, the screw is inserted into each of the screw holes provided on the grommet and the cover so as to fix the grommet and the cover to the case. Further, by abutting the leg portion of the cover against the case, the pedestal portion of the grommet is compressed by the cover. The grommet is thus pressed against the case thereby ensuring sealed condition between the case and the grommet.

BRIEF DESCRIPTION OF THE DRAWINGS

FIG. 1 is a perspective view of a closed-type motor according to an embodiment of the present invention;

FIG. 3 is a grommet applied to the closed-type motor according to FIG. 1, wherein

FIG. 4 is a tube applied to the closed-type motor according to FIG. 1, wherein

FIG. 5 is a cover applied to the closed-type motor according to FIG. 1, wherein

FIG. 7 is an exploded section view which shows one applied example of the wire-drawn portion of the lead wire in connection with the closed-type motor according to FIG. 1;

FIG. 8 is an exploded section view which shows another applied example of the wire-drawn portion of the lead wire in connection with the closed-type motor according to FIG. 1;

DETAILED DESCRIPTION OF THE INVENTION

Hereinafter, embodiments of the present invention will be explained with reference to the accompanying drawings.

Referring to FIG. 1, a closed-type motor 10 according to an embodiment of the present invention is shown. This closed-type motor 10 can be categorized into a stepping motor which is suitable for being installed into textile machineries and medical equipments. Here, since basic architecture of the closed-type motor 10 is conventional, and the embodiments of the present invention are applicable to any other closed-type motors other than the closed-type motor 10, further details as to the closed-type motor 10 itself will be omitted.

Figure 2:
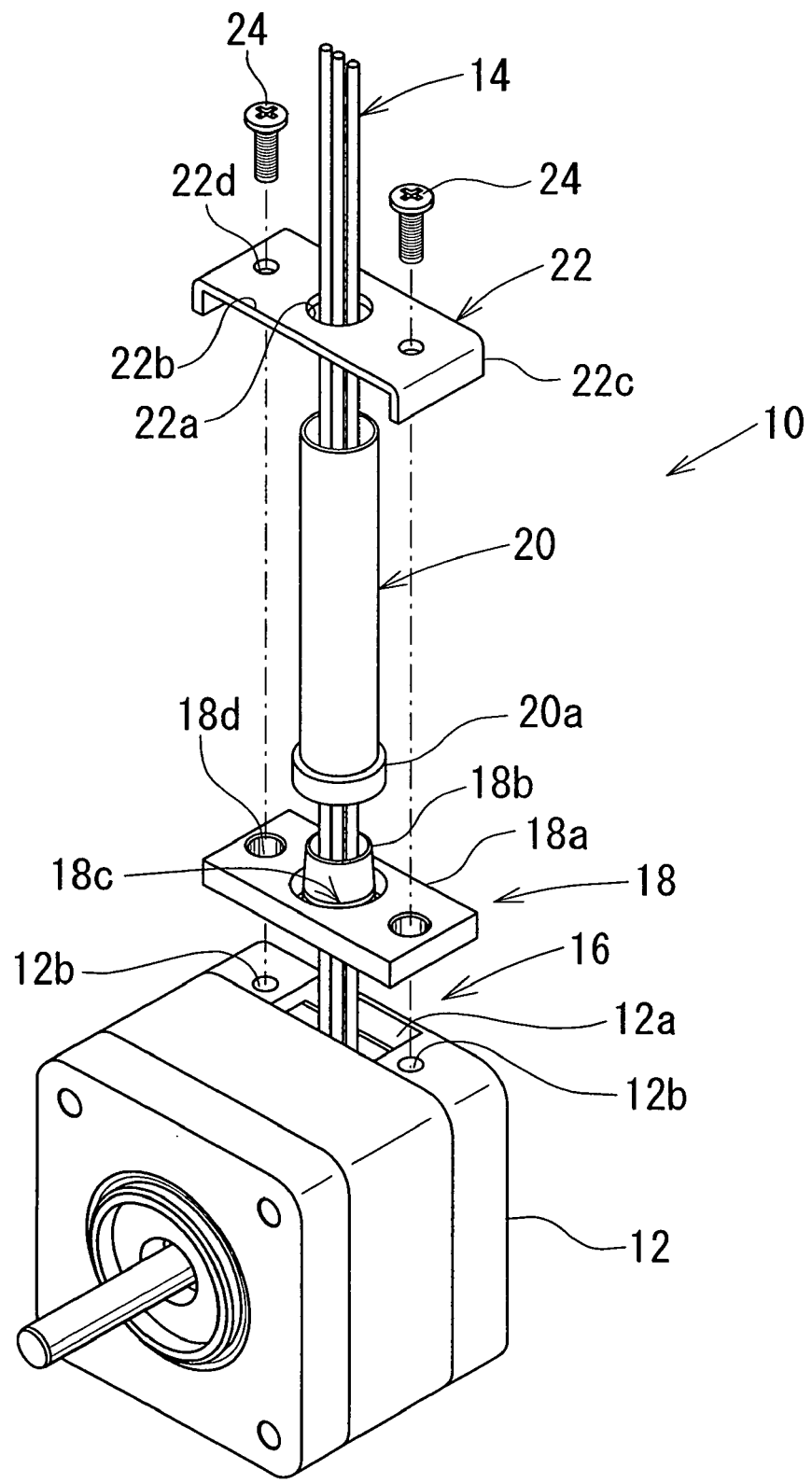
FIG. 2 is an exploded view of a wire-drawn portion of a lead wire in connection with the closed-type motor according to FIG. 1.

In the closed-type motor 10, as shown in FIG. 2, a grommet 18, a tube 20 and a cover 22 are provided as a sealing structure of a wire-drawn portion 16 of a lead wire 14 in a case 12 of a motor.

Figure 3A:
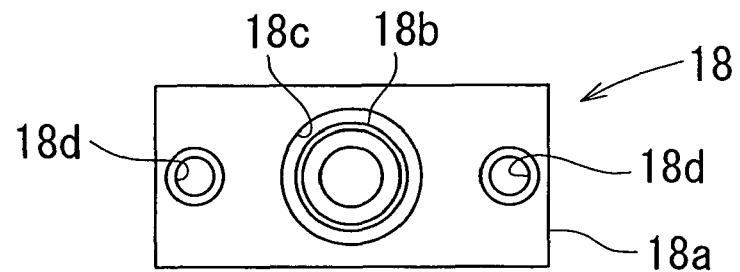
FIG. 3A is a plan view.
Figure 3B:
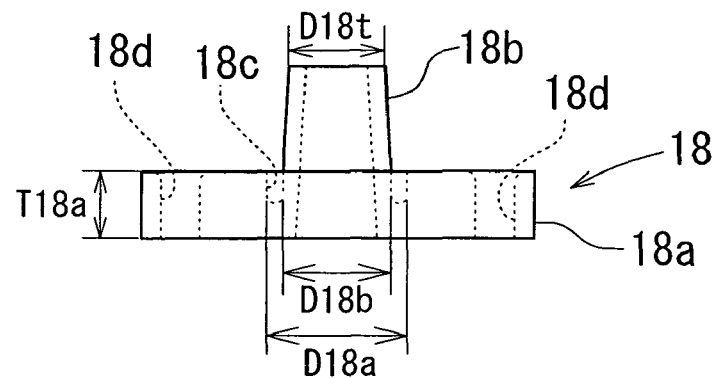
FIG. 3B is a side view.

The grommet 18 are made of an elastic body such as a silicone rubber and has a through-hole into which the lead wire 14 is inserted, so that the grommet 18 is abutted against the case 12 of the motor so as to seal an opening portion 12a formed on the case 12. Further, as shown in FIG. 3, the grommet 18 comprises: a rectangular block-shaped pedestal portion 18a which is abutted against the case 12; a tubular projection 18b provided with the through-hole into which the lead wire 14 is inserted, the tubular projection 18b protruding outwardly the case 12 from the pedestal portion 18a; and an annular groove 18c surrounding a basal portion of the tubular projection 18b. The pedestal portion 18a should be formed larger than the opening portion 12a of the case 12.

A sectional area of an internal hole of the tubular projection 18b is formed to be equal to or lager than a sectional area of the lead wire 14 to be inserted into the tubular projection 18b. According to figures, since the lead wire 14 is composed by a bunch of wires, the sectional area of the internal hole of the tubular projection 18b needs to be equal to or larger than the sectional area of whole bunch of the wires. Further, an outer peripheral wall of the tubular projection 18b, as shown in FIG. 3, is formed as gradually reducing its diameter from the basal portion to a tip portion thereof, that is, from D18b to D18t (D18b>D18t). Still further, the pedestal portion 18a is provided with a second screw hole 18d for a screw 24 in which to be screwed on a third screw hole 12b of the case 12.

Figure 4A:
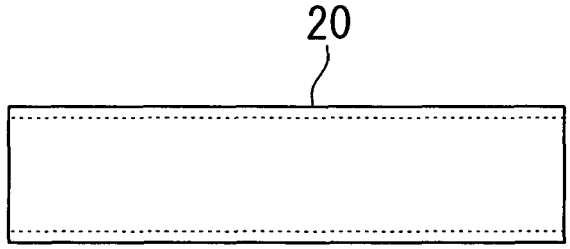
FIG. 4A is a side view.
Figure 4B:
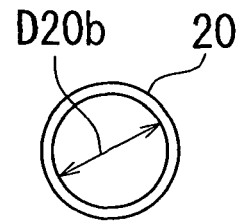
FIG. 4B is a front view.
Figure 6:
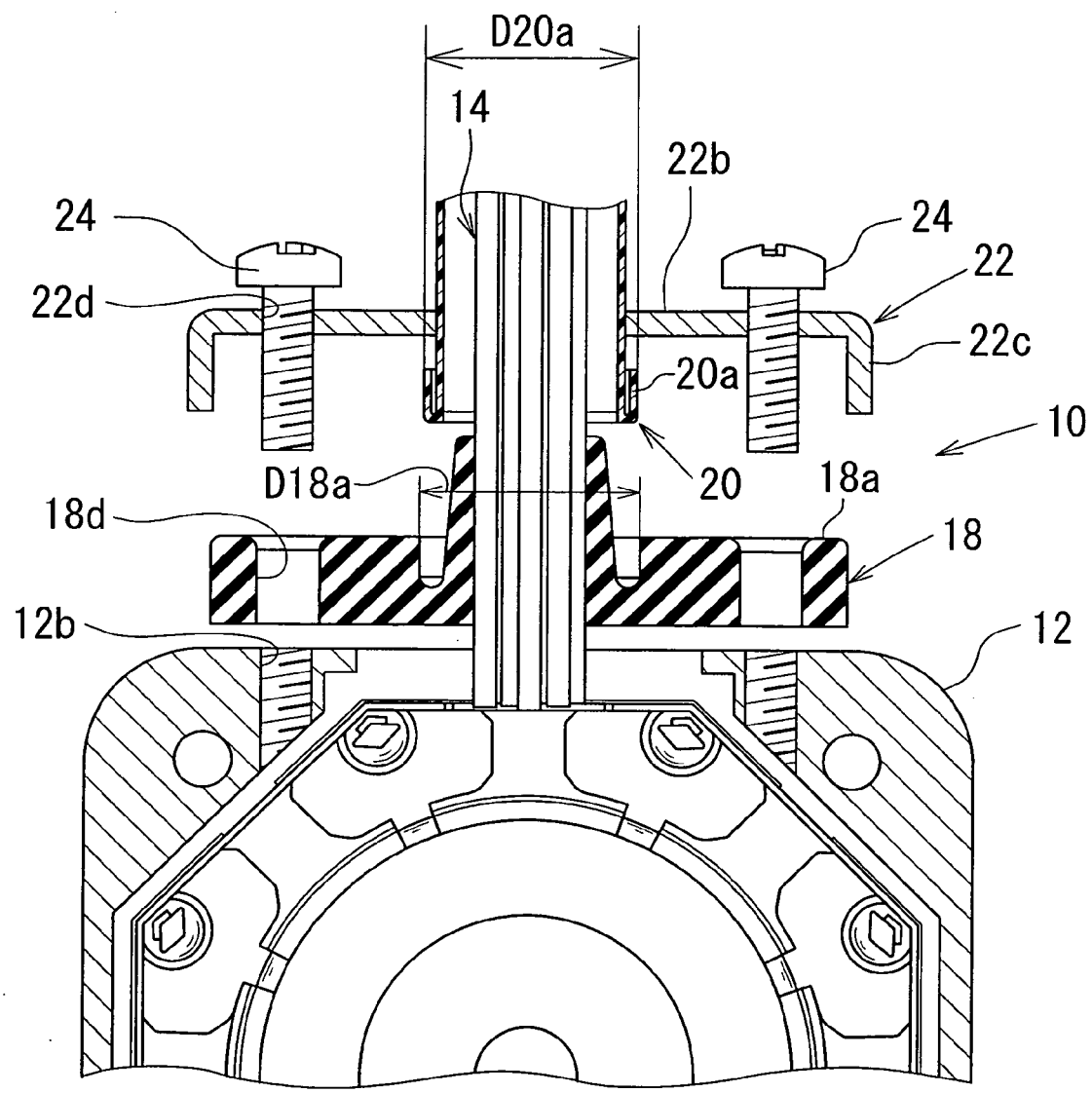
FIG. 6 is an exploded section view of the wire-drawn portion of the lead wire in connection with the closed-type motor according to FIG. 1.

The tube 20 is connected with the grommet 18, and the lead wire 14 is inserted into an interior of the tube 20. The tube 20 is made of an elastic body such as polyvinyl chloride (PVC). A sectional area of an internal hole of the tube 20 is equal to or larger than the sectional area of the lead wire 14, and an internal diameter D20b shown in FIG. 4 is equal to or less than an outer diameter D18b in the basal portion of the tubular projection 18b of the grommet 18. Furthermore, as shown in FIGS. 2 and 6, by turning up an end portion of the tube 20, a large diameter portion 20a is provided on the end portion of the tube 20, wherein a diameter of the large diameter portion 20a is larger than the one of a central hole 22a of the cover 22. Here, it is preferable that an external diameter D20a of the large diameter portion 20a is equal to or larger than an outer peripheral diameter D18a of the annular groove 18c (see FIG. 3B and FIG. 6).

Figure 5A:
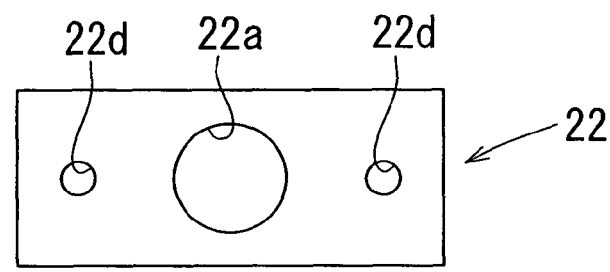
FIG. 5A is a plan view.
Figure 5B:
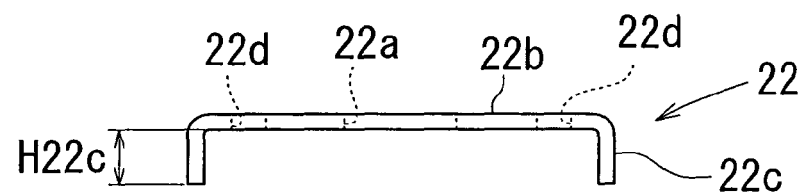
FIG. 5B is a side view.

The cover 22 covers the grommet 18 so as to be fixed to the case 12. According to figures, the cover 22 is a sheet-metal component made of a cold rolled steel. As shown in FIG. 5, the cover 22 comprises: a flat portion 22b abutted on an upper surface of the pedestal portion 18a of the grommet 18; and a leg portion 22c (refer to H22c in FIG. 5B) bent along a lateral face of the pedestal portion 18a of the grommet 18, the leg portion 22c being shorter than thickness (refer to T18a in FIG. 3B) of the pedestal portion 18a, that is, T18a>H22c. On the flat portion 22b of the cover 22, a first screw hole 22d for the screw 24 is provided so as to be screwed on the third screw hole 12b of the case 12.

According to the above, assembling procedures of the sealing structure of the wire-drawn portion 16 of the lead wire 14 in the case 12 of the motor comprising the grommet 18, the tube 20 and the cover 22 will be explained hereinafter with reference to FIG. 2.

First, the lead wire 14 drawn out from the opening portion 12a of the case 12 is inserted into the tubular projection 18b of the grommet 18, and the grommet 18 is then placed on the case 12 as to cover the opening portion 12a of the case 12. At this time, the second screw hole 18d of the grommet 18 is made correspondent with the third screw hole 12b of the case 12.

Next, the lead wire 14 drawn out from the tubular projection 18b of the grommet 18 is inserted into the tube 20. Then, by turning up the end portion of the tube 20, the large diameter portion 20a is formed on the end portion of the tube 20.

In a subsequent manner, the tube 20 is inserted into the tubular projection 18b, and the large diameter portion 20a of the tube 20 is fitted to the annular groove 18c which surrounds the basal portion of the tubular projection 18b.

The lead wire 14 and the tube 20 are then inserted into the central hole 22a of the cover 22, and the flat portion 22b of the cover 22 is placed on the upper surface of the pedestal portion 18a of the grommet 18. At this time, the first screw hole 22d of the cover 22 is made correspondent with the second screw hole 18d of the grommet 18.

Finally, the screw 24 is inserted into both the first screw hole 22d of the cover 22 and the second screw hole 18d of the grommet 18 in such a manner that the screw 24 is tightly fastened to the third screw hole 12b of the case 12 until the leg portion 22c of the cover 22 is abutted to the case 12. The pedestal portion 18a of the grommet 18 is then compressed to be deformed thereby abutting the pedestal portion 18a of the grommet 18 against the surface of the case 12.

With the above architectures according to the embodiments of the present invention, the following operational effects can be obtained.

In the closed-type motor 10, by abutting the grommet 18 against the case 12 with the cover 22, it is possible to ensure a superior sealed condition between the case 12 and the grommet 18. Further, by fitting the tube 20 into the tubular projection 18b of the grommet 18, a superior sealed condition between the grommet 18 and the tube 20 can be ensured. As discussed, without applying conventional architectures such as fixation by inpouring the flow-type silicone rubber into clearance or usage of the water-resistant connector header, the sealing treatments of the wire-drawn portion 16 of the lead wire 14 in the case 12 of the closed-type motor 10 can be securely conducted by a three-piece structure composed of the grommet 18, the tube 20 and the cover 22.

To be more specific, by abutting the pedestal portion 18a of the grommet 18 against the case 12, it is possible to ensure the sealed condition between the case 12 and the grommet 18. Further, since the internal diameter D20b of the tube 20 is formed to be equal to or less than the outer diameter D18b of the tubular projection 18b of the grommet 18, by fitting the tube 20 to the tubular projection 18b of the grommet 18, the tube 20 or the tubular projection 18b of the grommet 18 is elastically deformed thereby adhering to each other, contributing to ensuring the sealed condition between the grommet 18 and the tube 20. Moreover, by fitting the end portion (the large diameter portion 20a) of the tube 20 into the annular groove 18c which surrounds the basal portion of the tubular projection 18b of the grommet 18, it is possible to further enhance sealed condition between the grommet 18 and the tube 20 so as to concurrently prevent displacement therebetween.

Since the sectional area of the inner hole of tubular projection 18b is equal to or larger than the sectional area of the lead wire 14 inserted into the tubular projection 18b, any damage in connection with the insulating layers of the lead wire 14 for making the lead wire 14 being compressed by the tubular projection 18b can be prevented. Similarly, since the sectional area of the inner hole of the tube 20 is equal to or larger than the sectional area of the lead wire 14, any damage in connection with the insulating layers of the lead wire 14 for making the lead wire 14 being compressed by the tube 20 can be prevented. Further, it becomes unnecessary to use high-hardness rigid tubes, so that handling of the lead wire 14 (such as bending) will not be subjected to any limitation.

Still further, the cover 22 covers the grommet 18 so as to be fixed to the case 12 in a state where the tubular projection 18b of the grommet 18 and the tube 20 fitted to the tubular projection 18b are inserted into the central hole 22a of the cover 22. With this architecture, the grommet 18 is abutted against the case 12.

Moreover, when the cover 22 covers the grommet 18 so as to be fixed to the case 12 in a state where the tubular projection 18b of the grommet 18 and the tube 20 fitted to the tubular projection 18b are inserted into the central hole 22a of the cover 22, the large diameter portion 20a formed by turning up the end portion of the tube 20 can function as a stopper preventing the tube 20 from being slipped off from the central hole 22a of the cover 22.

Furthermore, since the outer peripheral wall of the tubular projection 18b of the grommet 18 is reduced in its diameter in a direction from the basal portion to the tip portion of the tubular projection, that is, from D18b to D18t (D18b>D18t), the end portion of the tube 20 can be fitted more easily and securely relative to the tubular projection 18b. See FIG. 3.

In addition, in a state where the flat portion 22b of the cover 22 is just attached to the upper surface of the pedestal portion 18a of the grommet 18, the leg portion 22c (H22c), which is shorter than the thickness T18a of the pedestal portion 18a, is spaced relative to the case 12 of the closed-type motor 10. However, by compressing the pedestal portion 18a of the grommet 18 with the cover 22 so as to abut the leg portion 22c against the case 12, the grommet 18 can be strongly pressed against the case 12, thereby ensuring sealed condition between the case 12 and the grommet 18. Here, in the embodiments of the present invention, the leg portion 22c of the cover 22 is provided only at each of short sides of the rectangular flat portion 22b but not at each of long sides thereof, whereby it is possible for the pedestal portion 18a of the grommet 18 to be deformed so as to be partially protruded from the cover 22. Accordingly, if compared with architecture where, for example, all four sides of the grommet 18 are sealed by the cover 22, even in a condition that the grommet 18 is compressed, it is still possible in the present invention to minimize risks of the insulating layers of the lead wire 14 being split off due to excessive pressure onto the lead wire 14 caused by unnecessary abutment between the lead wire 14 and the grommet 18. It becomes thus unnecessary for the insulating layers of the lead wire 14 to be formed with hard resin. From this viewpoint, architecture ensuring superior sealed condition in connection with the wire-drawn portion of the lead wire 14 in the case 12 can be achieved with less cost. Still further, the same operational effects as discussed hereinabove can be obtained as long as the cover 22 includes any opening which enables the grommet 18 to be protruded therefrom when the grommet 18 is deformed. Accordingly, the formation of the cover 22 is not limited based on the disclosed figures.

Moreover, in the present invention, the screw 24 is inserted into the first screw hole 22d and the second screw hole 18d formed respectively on the cover 22 and the grommet 18 so as to fix both the cover 22 and the grommet 18 to the case 12. The leg portion 22c of the cover 22 is thus abutted against the case 12 thereby compressing the pedestal portion 18a of the grommet 18 with the cover 22. Accordingly, the grommet 18 is abutted against the case 12, ensuring sealed condition between the case 12 and the grommet 18.

With reference to FIGS. 7 to 10, some applied examples of the large diameter portion 20a of the tube 20 are shown. In the large diameter portion 20b of the tube 20 as shown in FIG. 7, one end portion of tube 20 is formed thicker. Further, in the large diameter portion 26 of the tube 20 as shown in FIG. 8, the individual ring 26 is fixed at a place where adjacent to the end portion of the tube 20. The ring 26 is used, for example, with a metal C-ring, so that the tube 20 is provided with a groove 20d with which the ring 26 is engaged.

Figure 9:
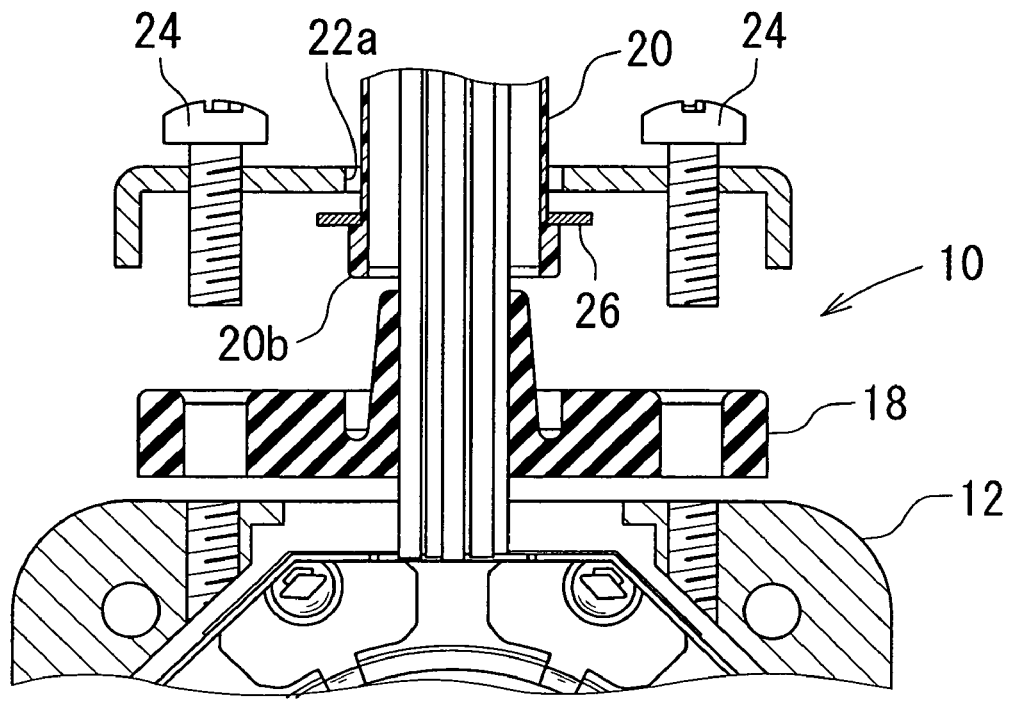
FIG. 9 is an exploded section view which shows yet another applied example of the wire-drawn portion of the lead wire in connection with the closed-type motor according to FIG. 1.
Figure 10:
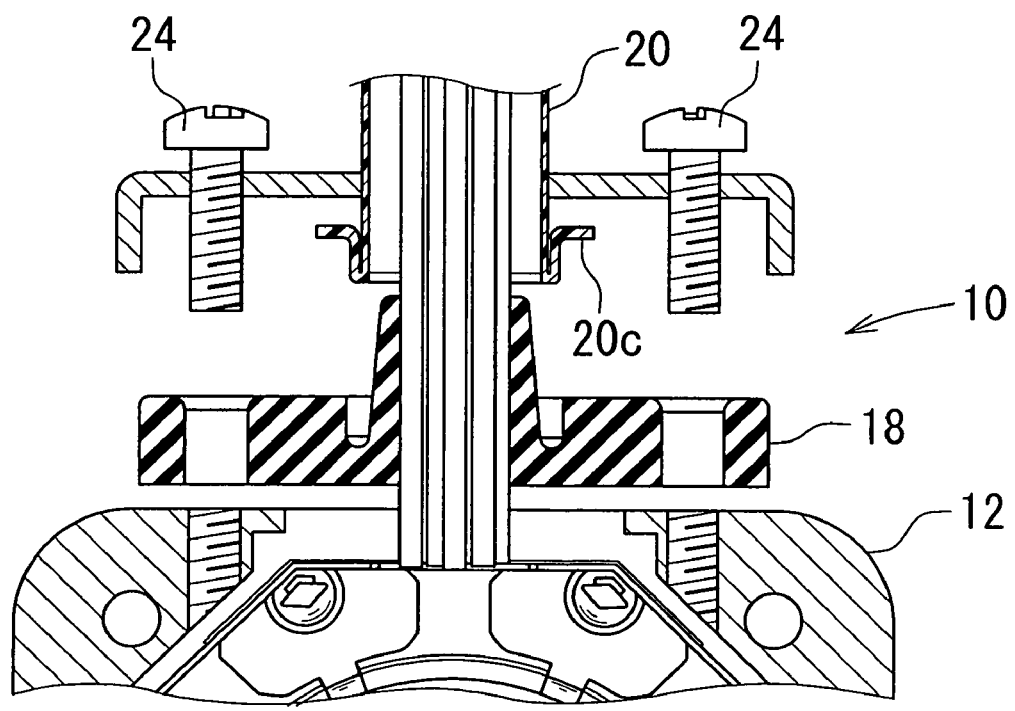
FIG. 10 is an exploded section view which shows further another applied example of the wire-drawn portion of the lead wire in connection with the closed-type motor according to FIG. 1.

In FIG. 9, the large diameter portion 20b where the end portion of the tube 20 is made thicker and the ring 26 are structured as a combination. In this example, even though the central hole 22a of the cover 22 is formed to have a diameter larger than the one of the tube 20, there is no case that the ring 26 is slipped off form the central hole 22a. Still further, in the large diameter portion 20c of the tube 20 as shown in FIG. 10, the end portion of the tube 20 turned up is further extended outside in a radius direction.

In any applied examples discussed hereinabove, the same functional effects as the large diameter portion 20a of the tube 20 as shown in FIGS. 2 and 6 can be obtained.

What is claimed is:

1. A closed-type motor comprising:
    a grommet formed by an elastic material and provided with a through-hole into which a lead wire is inserted, the grommet being abutted on a case of a motor so as to cover an opening portion formed on the case;
    a tube formed by an elastic material and connected to the grommet where the lead wire is inserted into an interior of the tube;
    a cover which covers the grommet so as to be fixed to the case,
    wherein the grommet comprises: a pedestal portion abutted to the case; a tubular projection provided with the through-hole into which the lead wire is inserted, the tubular projection being projected outside the case from the pedestal portion; and an annular groove surrounding a basal portion of the tubular projection, the tubular projection having a sectional area of an internal hole which is equal to or larger than a sectional area of the lead wire to be inserted into the tubular projection,
    the tube has a sectional area of an internal hole which is equal to or larger than the sectional area of the lead wire and has an inner diameter which is equal to or less than an outer diameter of the tubular projection of the grommet, and
    the cover is provided with a central hole having a diameter which is equal to or larger than an outer diameter of the tube so as to insert the tubular projection of the grommet and the tube thereinto.

2. The closed-type motor according to claim 1, wherein an end of the tube adjacent to the grommet is provided with a large diameter portion which is larger than a diameter of the central hole of the cover.

3. The closed-type motor according to claim 2, wherein the large diameter portion of the tube is formed by turning up the end of the tube.

4. The closed-type motor according to claim 3, wherein the large diameter portion of the tube is formed as that the end of the tube turned up is further extended outside in a radius direction.

5. The closed-type motor according to claim 2, wherein the large diameter portion of the tube is formed by making the end of the tube thicker in a radius direction than the rest of the portions of the tube.

6. The closed-type motor according to claim 2, wherein the large diameter portion of the tube is formed by being fixed with an individual ring at a place where adjacent to the end of the tube.

7. The closed-type motor according to claim 1, wherein an outer peripheral wall of the tubular projection of the grommet is formed as reducing its diameter from the basal portion to a tip portion of the tubular projection.

8. The closed-type motor according to claim 1, wherein the cover comprises: a flat portion abutted on an upper surface of the pedestal portion of the grommet; and a leg portion bent along a lateral face of the pedestal portion of the grommet, the leg portion being shorter than thickness of the pedestal portion.

9. The closed-type motor according to claim 1, wherein the grommet and the cover are each provided with a screw-hole for a screw which is threaded into the case.

* * * * *